US008644967B2

(12) United States Patent
Seiler

(10) Patent No.: US 8,644,967 B2
(45) Date of Patent: Feb. 4, 2014

(54) VIBRATING FOOTWEAR DEVICE AND ENTERTAINMENT SYSTEM FOR USE THEREWITH

(76) Inventor: Brock Seiler, Jefferson Valley, NY (US)

( * ) Notice: Subject to any disclaimer, the term of this patent is extended or adjusted under 35 U.S.C. 154(b) by 1402 days.

(21) Appl. No.: 12/141,701

(22) Filed: Jun. 18, 2008

(65) Prior Publication Data

US 2009/0007458 A1 Jan. 8, 2009

Related U.S. Application Data

(60) Provisional application No. 60/936,115, filed on Jun. 18, 2007.

(51) Int. Cl.
*G06F 17/00* (2006.01)

(52) U.S. Cl.
USPC ................ 700/94; 36/139; 381/151; 381/301

(58) Field of Classification Search
USPC ................ 381/301, 333, 388; 36/139; 700/94
See application file for complete search history.

(56) References Cited

U.S. PATENT DOCUMENTS

| | | | | | |
|---|---|---|---|---|---|
| 5,321,763 | A * | 6/1994 | Lee | 381/301 |
| 5,369,386 | A * | 11/1994 | Alden et al. | 335/206 |
| 5,553,148 | A * | 9/1996 | Werle | 381/300 |
| 5,836,899 | A * | 11/1998 | Reilly | 601/46 |
| 5,895,348 | A * | 4/1999 | Hosaka | 600/27 |
| 6,309,077 | B1 * | 10/2001 | Saif et al. | 359/871 |
| 6,315,571 | B1 * | 11/2001 | Lee | 434/250 |
| 6,320,113 | B1 * | 11/2001 | Griffin et al. | 84/738 |
| 6,369,312 | B1 * | 4/2002 | Komatsu | 84/723 |
| 6,422,941 | B1 * | 7/2002 | Thorner et al. | 463/30 |
| 7,114,822 | B2 * | 10/2006 | Guzman | 362/103 |
| 7,832,124 | B2 * | 11/2010 | Blockton | 36/136 |
| 2007/0205693 | A1 * | 9/2007 | Takiguchi | 310/314 |
| 2011/0128132 | A1 * | 6/2011 | Ullrich et al. | 340/407.1 |

FOREIGN PATENT DOCUMENTS

| | | | |
|---|---|---|---|
| WO | WO 2007064735 | A2 * | 6/2007 |
| WO | WO 2008151642 | A1 * | 12/2008 |

* cited by examiner

*Primary Examiner* — Joseph Saunders, Jr.
(74) *Attorney, Agent, or Firm* — Ostrolenk Faber LLP

(57) ABSTRACT

A footwear device for enhancing an entertainment experience in accordance with an embodiment of the present application includes a first actuator mounted in the footwear device and operable to impart a vibration to the footwear device based on an indication of reproduced sound included in the entertainment experience. A vibration signal is provided to drive the vibration of the footwear device and may be based on reproduced audible information and/or enhanced information optimized to maximize vibration. The present application also relates to an entertainment system for use with the vibrating footwear device.

13 Claims, 10 Drawing Sheets

VIBRATING FOOTWEAR DEVICE AND ENTERTAINMENT SYSTEM FOR USE THEREWITH

CROSS-REFERENCE TO RELATED APPLICATIONS

The present application claims benefit of and priority to U.S. Provisional Patent Application Ser. No. 60/936,115 filed Jun. 18, 2007, entitled AUDIO ACTIVATED VIBRATING FOOTWEAR DEVICE, the entire contents of which are hereby incorporated by reference herein.

BACKGROUND

1. Field of the Disclosure

The present disclosure relates to a vibrating footwear device and an entertainment system for use therewith to enhance the sensory perception of an entertainment experience. More specifically, the vibrating footwear device includes at least one actuator that is operable to provide vibration, which reproduces the sensation of ground vibration to enhance an entertainment experience. The vibration provides simulated force feedback resonating from the ground similar to that which would be present at a live event, which dramatically improves the experience of listening to music, watching a movie or playing a video game, for example. This device expands the audio event outside the confines of the head to involve the body in an immersive physically felt portable experience.

2. Related Art

There are a wide variety of portable entertainment devices available to consumers today, including MP3 players, portable DVD players and even cellular telephones that can store and/or reproduce recorded music or movies. Most of these devices provide stereo sound to users via conventional earphones. While earphones provide suitable sound, they typically cannot provide a fully satisfying sensory experience given their limited functionality, which narrowly focuses the sound to only one sensory channel, the ears.

While humans gather a significant amount of pitch and localization information through their ears, humans depend on other senses to augment the sounds that they hear. For thousands of years, ground vibrations have augmented hearing. That is, in many situations, even as one hears a sound, they are also sensing non-audible vibrations associated therewith that provides additional information that is often necessary. Indeed, even human skin and muscle tissue is sensitive to sound energy waves to provide additional information regarding the sounds that we hear. For example, consider ancient man out on the plain, in the path of stampeding animals. While the sound of such a stamped would be audible, it is the tactile vibrations associated with the stampede that provide the additional information that will trigger the individual to realize the danger that they are in. That is, the forces of ground vibrations sensed through the nerve receptors of the individual's feet provide additional information regarding the approaching danger.

In another example, consider an observer 5 positioned close to an exploding volcano 8 as illustrated in FIG. 1, for example. The sound waves from the explosion will reach the observer's ears in the normal course of events. However, the force of the explosion also cause vibration of the ground under the observer's feet, as indicated by the reference numeral 9 and can be felt through the left and right feet 6, 7 of the observer as well. These vibrations travel up the observer's legs 10, 11 and also trigger nerve impulses that also travel up the body to the brain 12. The brain then assimilates the audible sounds with the vibrations felt and provides a clearer picture of the situation that the observer finds himself in. Reproduced audio to the ears only can not recreate the immersive experience described above.

In particular, the human body has developed such that such vibrations are primarily sensed through our feet. Naturally, other parts of our bodies are sensitive to vibration, but humans have evolved in such a way that their feet are the primary source for gathering information about these vibrations. This development is to be expected since feet are typically in the closest contact with the ground, which is also a good medium for the transmission of these vibrations. Indeed, even in modern society, where most people wear shoes, without thinking about it, humans collect a vast amount of information from vibrations that are sensed by their feet. Consider the simple case where an object is dropped near an observer. While the observer may have some idea of where the object was dropped based on the audible sound, the vibration of the floor provides force feedback information that can aid the observer in pinpointing the object. Therefore, a stereo field may be heard by the ears to identify the whereabouts of a sound source, but also by the nerve receptors in the feet help aid sensory perception to determine the direction, size and weight of the object dropped. We humans perceive live music and other events via simultaneously coordinated multiple sensory 'channels' (sound, vision, touch), the experience of a live event is more convincing than a simple audio recording-in other words, the circuit between the stimulus event and perception is complete.

Modern rock concerts often take advantage of the unique sensory input provided by the listener's feet. As can be seen in FIG. 2, for example, audio engineers in such concerts may pan certain instruments from left to right in order to manipulate the stereo field of vibrations that reach the listener, these vibrations travel through the floor to the nerve receptors in the left and right foot. The left and right speakers 16, 17 provide sound waves based on music performed by the band 15 and the live engineers. The arrows 18, 19 represent the vibrations produced by the band and speakers that travel to the listener's feet 13, 14. These vibrations are sensed by the listener's feet and conveyed up their legs 20, 21, by way of nerve impulses to the brain. There, the information regarding the vibrations is synthesized with the auditory information (obtained via the user's ears 22, 23) in the sensory cortex of the brain to provide an enhanced music experience where the listener both hears and feels the separate vibrations of the stereo field of the music. It is noted that both the band 15 and the speaker output energy, represented by the arrows designated by reference numerals 24, 25, contribute to the vibrations felt by the user. In addition, visual information from the user's eyes also contributes to the overall experience, as well, and is synchronized with the audible and vibration information in the sensory cortex. The presence of the stereo signal exists in virtually all produced music. Therefore it would be a great advantage to provide a device, which makes use of an already evolved sensory channel in a human to enhance the stereo image of any audio entertainment media by force feedback vibration simulating a live event felt through the feet.

Thus, audible information (typically in the range of 20-20,000 Hz, especially when only presented to the ears) represents only a portion of the information that sound energy conveys to observers. While home theatre surround sound type systems attempt to convey some of these vibrations using a sub-woofer to enhance low frequency sound elements, the results are unsatisfactory. The size of such devices prohibits them from being portable while the effect of such devices cannot be duplicated using conventional earphones.

Accordingly, it would be advantageous to provide a device that allows for an enhanced entertainment experience by allowing a user to feel, as well as listen to the stereo vibrations of music, movies, or other media, on a portable device.

SUMMARY OF THE INVENTION

It is an object of the present application to provide a vibrating footwear device and a system for use therewith that provides simulated ground vibration to provide force feedback creating a live sensory perception of an entertainment experience.

A footwear device for enhancing an entertainment experience in accordance with an embodiment of the present application includes a first actuator mounted in the footwear device and operable to impart a vibration to the footwear device based on an indication of reproduced sound included in the entertainment experience.

An entertainment system in accordance with an embodiment of the present application includes a portable player operable to reproduce at least audible information for an entertainment experience, a controller connected to the portable player and operable to provide an audible signal based on the reproduced audible information from the portable player and a vibration signal related to the audible signal, an audible reproduction device operable to receive the audible signal from the controller and to reproduce the audible information to the user and a first footwear device connected to the controller and operable to vibrate based on the vibration signal to enhance the entertainment experience.

A method of enhancing an entertainment experience in accordance with an embodiment of the present application includes providing a reproduced audible information signal representing sound information in the entertainment experience, generating a vibration signal based on the reproduced audible information signal, wherein the vibration signal stimulates nerve receptors in the foot area that complement the audible information signal and providing the vibration signal to a footwear device such that the footwear device vibrates to provide additional sensory stimulation to a user wearing the footwear device to enhance the entertainment experience.

An entertainment system in accordance with an embodiment of the present application includes a portable player operable to provide an audible information signal representing sound information in the entertainment experience; an audible reproduction device operable to receive the audible information signal from the portable player and to reproduce the sound information to the user, a micro digital player device operable to store a vibration signal that is based on the audible information signal, the vibration signal simulating vibrations complementary to the audible information signal and a vibrating footwear device operable to vibrate to enhance the entertainment experience for a user wearing the footwear device, wherein the micro digital player are attached to the footwear device to convey the vibration signal thereto to control vibration of the footwear device.

Other features and advantages of the present invention will become apparent from the following description of the invention, which refers to the accompanying drawings.

DETAILED DESCRIPTION OF THE EMBODIMENTS

Figure 3:
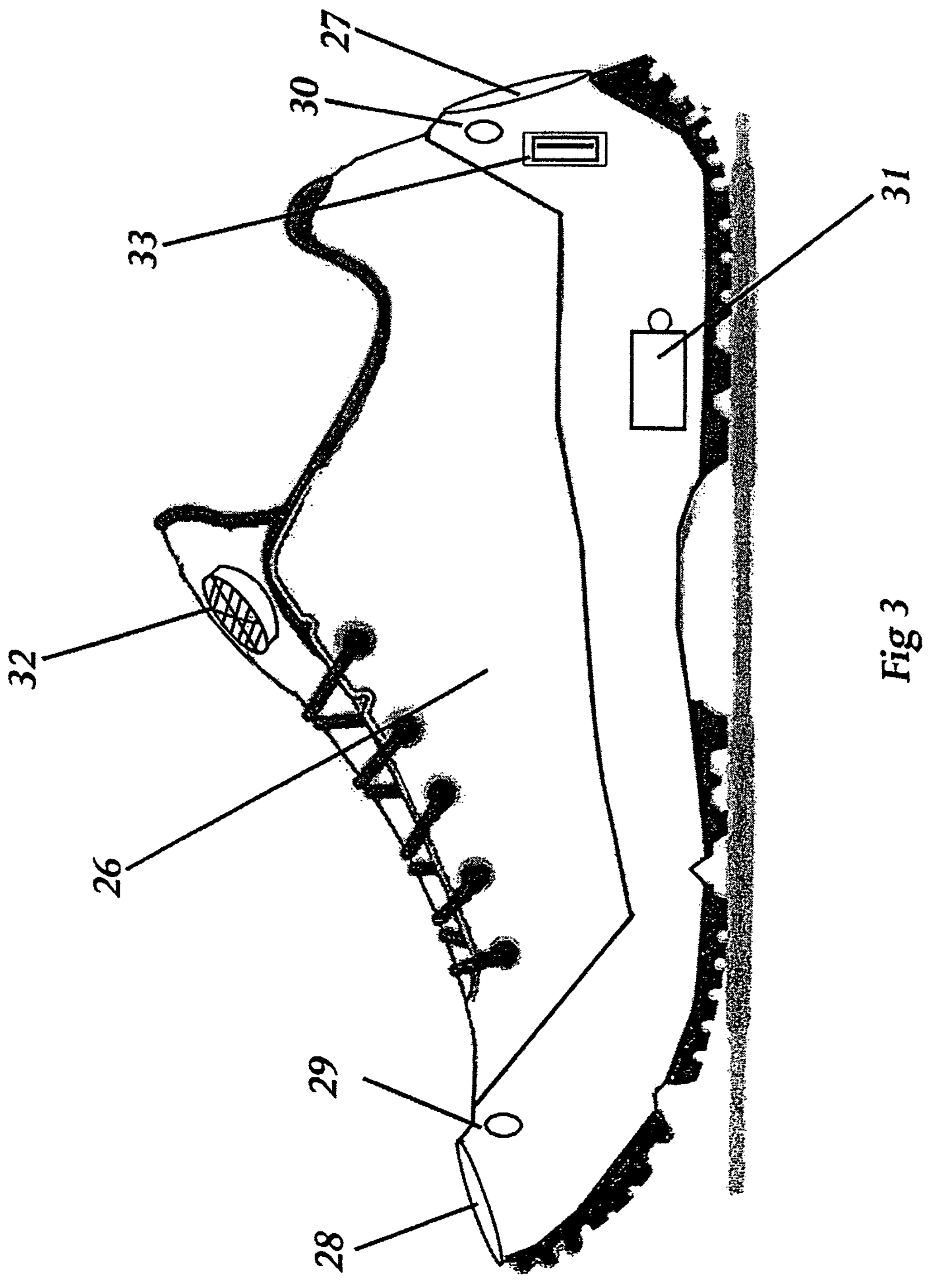
FIG. 3 is an illustration of a footwear device in accordance with an embodiment of the present application.
Figure 3A:
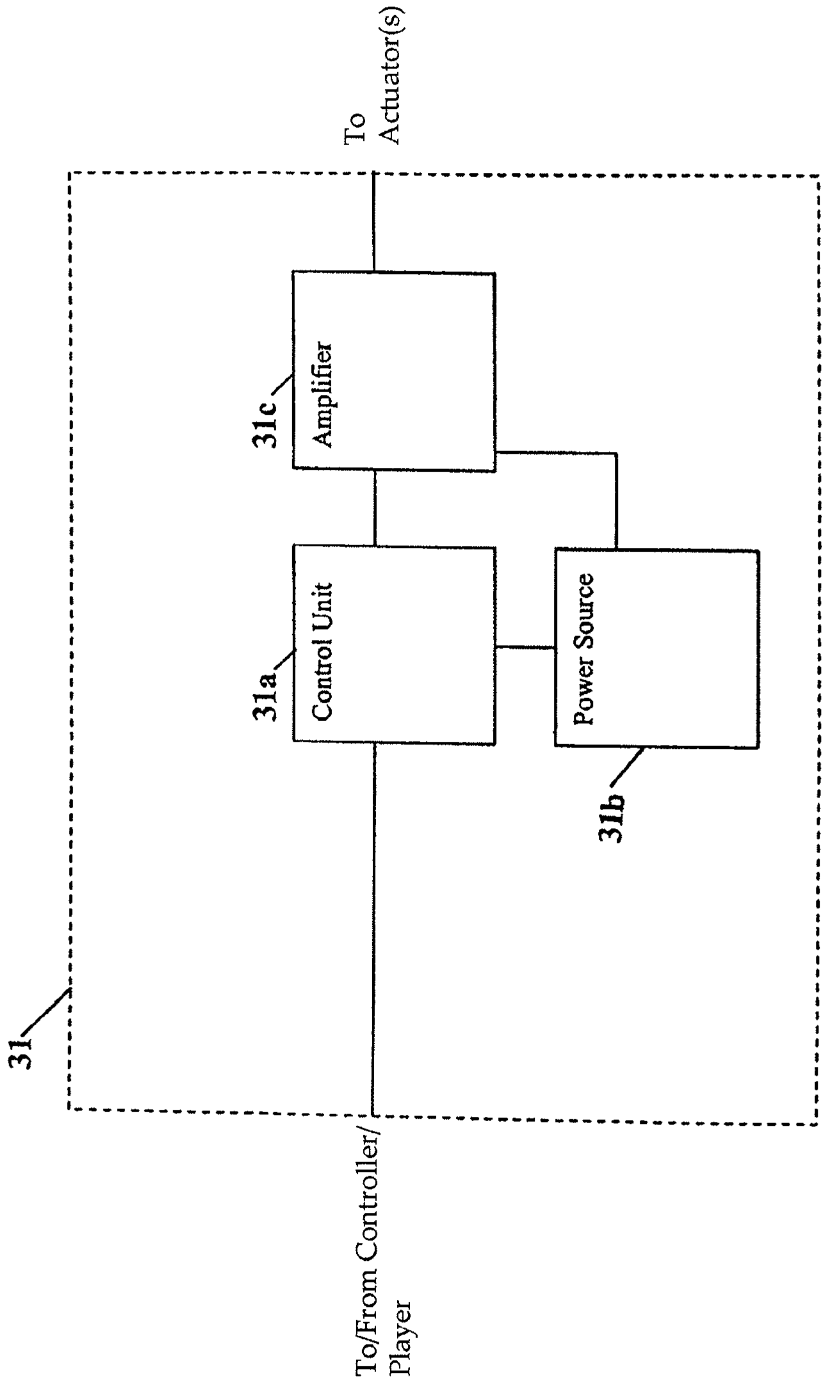
FIG. 3A is an illustration of a housing in the footwear device of FIG. 3.
Figure 4:
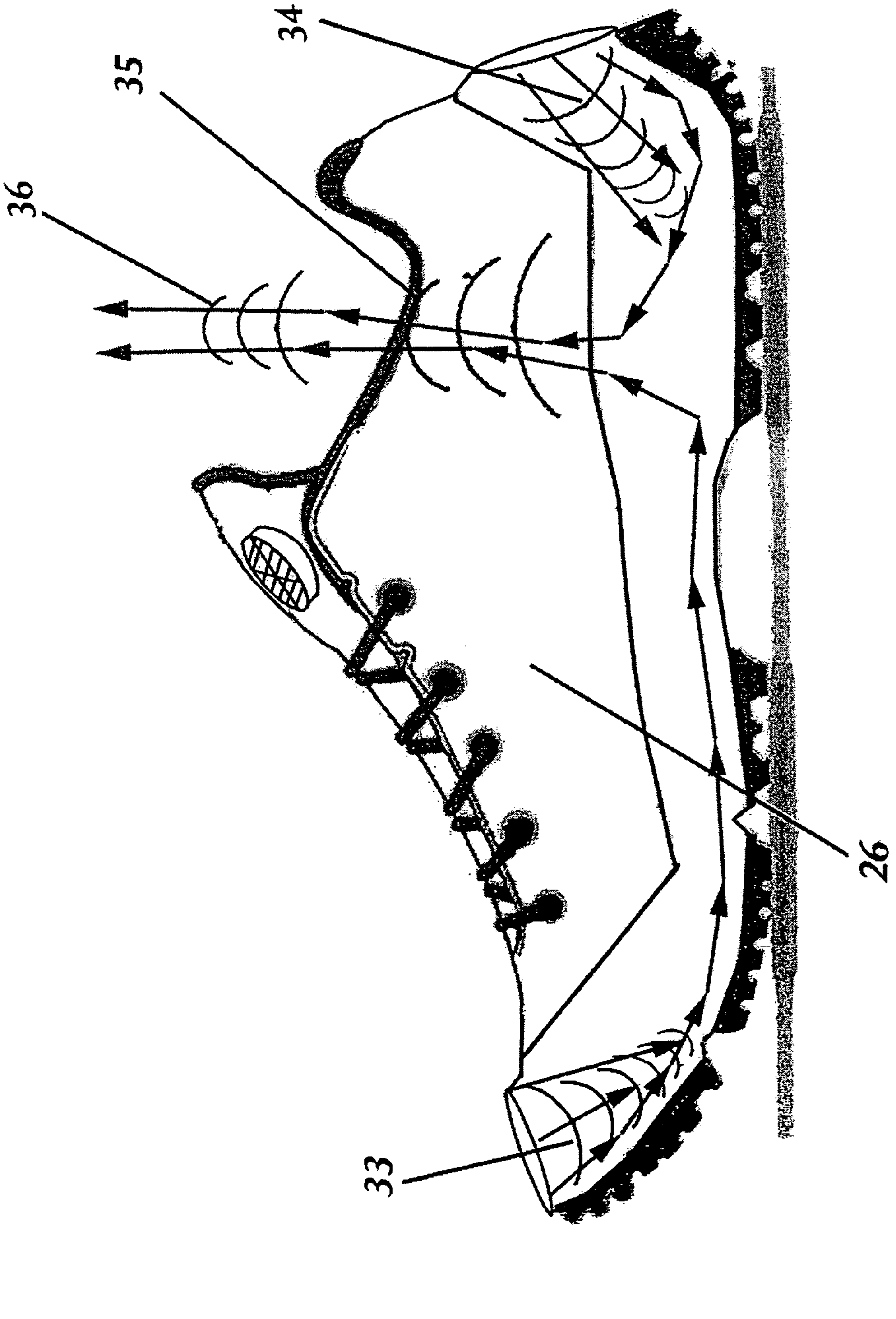
FIG. 4 is an illustration of the footwear device of FIG. 3 illustrating the effect of the actuators in imparting vibration.

FIGS. 3-4 illustrate an exemplary embodiment of a footwear device 26 in accordance with an embodiment of the present application. The footwear device 26 preferably includes a front vibrating actuator 28 and a rear vibrating actuator 27 operable to vibrate the device 26 in accordance with reproduced sound preferably from a media device or portable player device (see FIGS. 5 and 6, for example). That is, the actuators 27, 28 vibrate the footwear device 26 to enhance the experience of listening to music, a movie or any other entertainment media. In a preferred embodiment, illustrated in FIG. 3, the footwear device 26 also includes a housing 31 which is preferably structured to accommodate a microprocessor, or other control unit, 31*a*, a power source 31*b* and at least one micro amplifier 31*c*(See FIG. 3A). The power source 31*b* is preferably a rechargeable battery, or batteries, however, any suitable power source may be used. The power source 31*b* should provide sufficient voltage and current to power the microprocessor and amplifier, or amplifiers 31*c*, to initiate vibration in the actuators 27, 28. In a preferred embodiment, a separate amplifier 31*c* is provided for each of the actuators 27, 28, however, if desired, a single amplifier may be used to drive both actuators. In a preferred embodiment, the microprocessor 31*a*, power source 31*b*, amplifiers 31*c* and actuators 27, 28 are all integrated within the sole of the footwear device 26. Alternatively, the actuators 27, 28 may be removably attached to the footwear device 26 and connected to the amplifiers 31*c* in any desired manner. The other electronics may be integrated into the sole of the device 26 or may be external.

The actuators for this device can be implemented using various technologies geared toward tactile sensation, for instance piston type voice coil transducers to push-pull solenoid actuators and custom dual voice coil push-pull actuators. The goal is to initiate vibration into the footwear device via the actuators, regardless of what specific actuator is used.

In a preferred embodiment, the actuators 27, 28 are driven based on a vibration signal, or signals, that are in turn based on the audible information being reproduced by a portable player 60, for example. It is noted, however, that the vibration signals need not be identical to the reproduced audible information. That is, one has the option to use the reproduced audible information to initiate vibration of the actuators 27, 28 or one may enhance or filter the information to model different floor compositions (wood, concrete, etc. . . . ) for example, or provide equalization so that tones or vibrations of a higher frequency, (for example a frequency of 600 Hz in the mid-range) can be boosted in level to better be perceived by the feet. The signal could also be minimized or precluded altogether and replaced with augmented or enhanced signals converted from the original sounds in order to otherwise provide a better vibration response and to improve power consumption for the actuators 27, 28. This is discussed in further detail below.

The footwear device 26 preferably also includes an LED or LED(s) 29,30 and a wireless receiver, preferably incorporated into housing 31 where the LED 29, indicate wireless activity corresponding with pulses of light that are synchronized to the vibration movement of the actuators. An input USB port, or jack 33 may also be used to input information such as wireless or hard-wired vibration signals to activate vibration of the actuators 27 and 28 in the device 26. The jack 33 also acts as a multipurpose accessory add-on interface for the device 26 and alternatively may include specialized wireless communications circuitry to provide the function of the wireless receiver mentioned above or, for example, to receive broadband internet or satellite radio or live show wireless interface peripherals and accessories to receive signals from a variety of formats. The jack 33 is illustrated as a USB port, however, any suitable jack may be used. In the embodiment illustrated in FIG. 3, a microphone 32 is also provided. This microphone 32 may be used to pick up sounds in the environment and to provide vibrations based on these sounds as well. The microphone may alternatively be added on separately as an accessory via the jack 33, if desired.

As can be seen in FIG. 4, the actuators 27, 28 induce vibrations 33, 34, 35 in the device 26. The actuators 27, 28 are preferably controlled by the microprocessor or control unit 31*a* mentioned above which preferably receives vibration signals from the controller 59. The amplifiers 31*c* are preferably positioned between the microprocessor 31*a* and the actuators 27, 28 and amplify the control signals, which are based on the vibration signals, provided from the microprocessor to the actuators 27, 28. The sole of the footwear device 26 vibrates in a way to mimic the ground vibration that would have occurred if it were a live event that produced the given sound. The vibration signal is preferably tailored to heighten sensory perception of ground vibration in the sensory cortex of the human brain. This may be done by the controller 59 (FIG. 5) of by the control unit 31*a* (FIG. 3A). That is the vibration signal may include other enhanced information that is used to enhance or increase the vibration of the device 26 when desired. The vibrations are felt by the nerve receptors in the user's feet. This is represented with reference numeral 36 in FIG. 4. Indeed, the vibrations 36 travels all the way up the user's leg, as well, to further enhance the user's experience.

Figure 5:
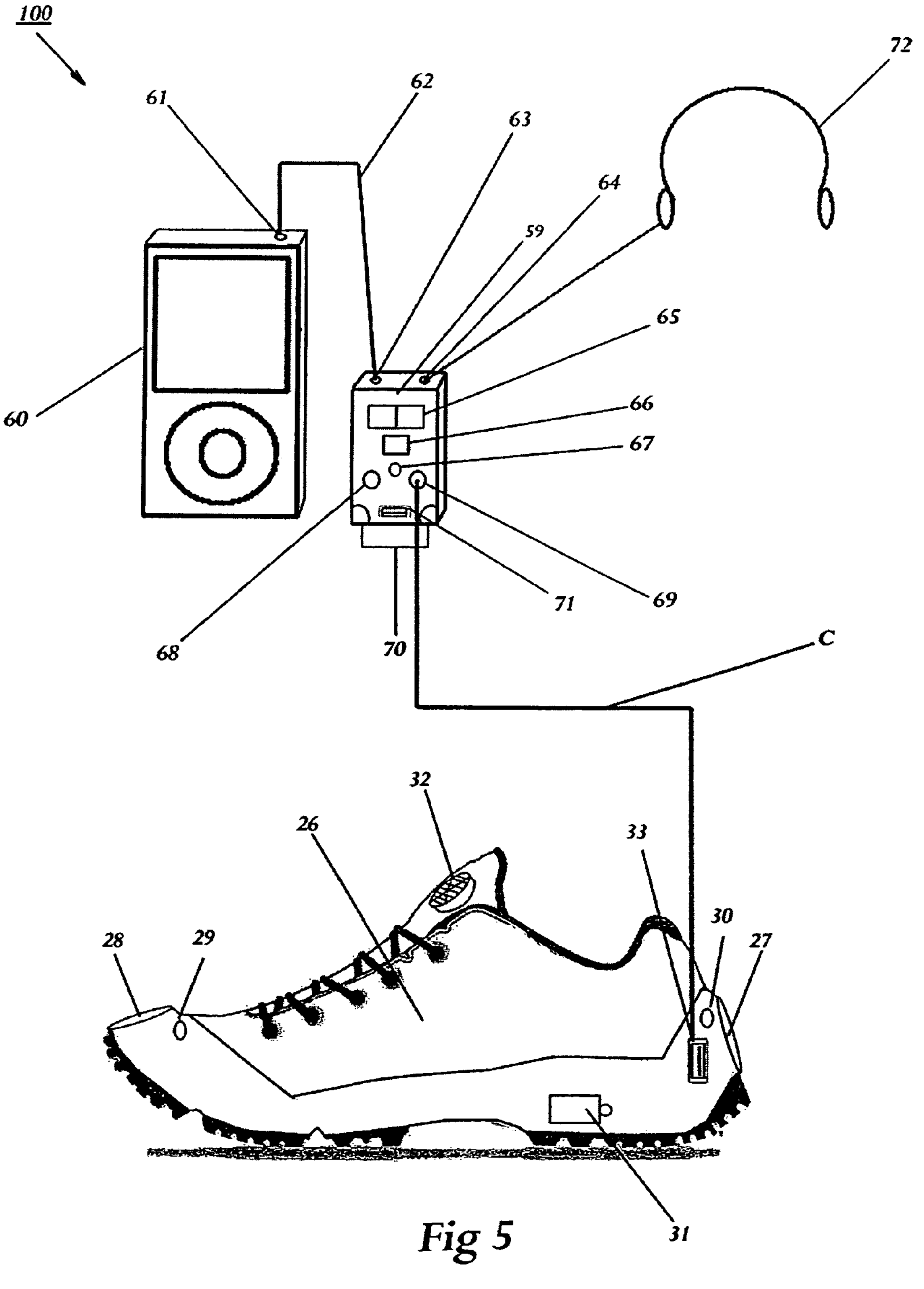
FIG. 5 is an illustration of an embodiment of an entertainment system for use with the footwear device of FIG. 3.
Figure 6:
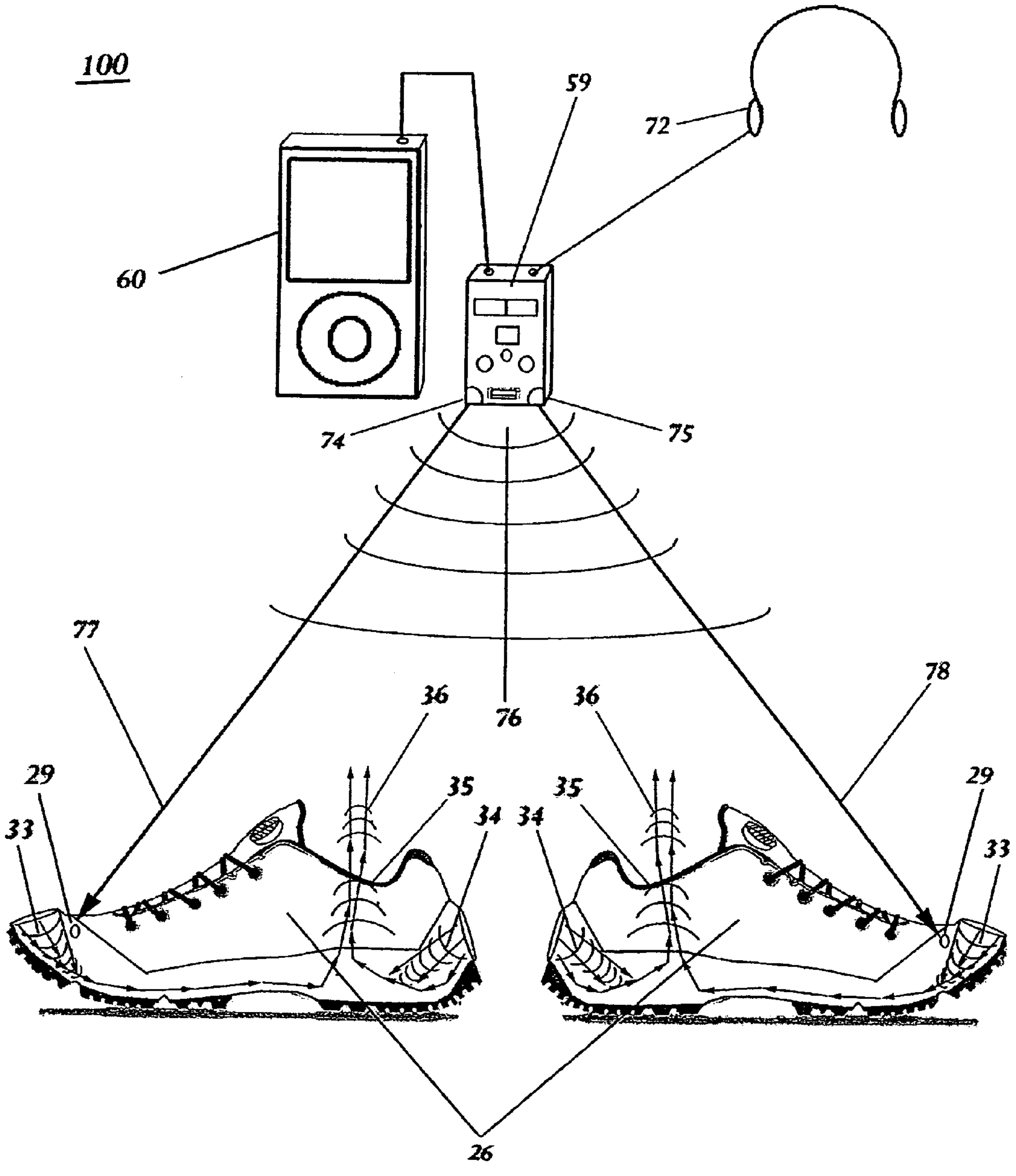
FIG. 6 is an illustration of another embodiment of an entertainment system for use with the footwear device using wireless transmission.

As can be seen in FIGS. 5 and 6, in a preferred embodiment, the footwear device 26 is part of an entertainment system 100 including media player 60 and the controller 59. The device 26 is preferably connected to the portable entertainment player device 60 (see FIG. 5). The controller 59 which preferably houses a rechargeable power supply to power a second microprocessor of the controller and integrated components is connected between the portable entertainment player device 60 and the footwear device 26. The controller 59 preferably receives the reproduced sound information from the media player device 60 via a standard stereo cable 62 with mini ⅛ inch jack on both ends inserted in the input jack 63 of the controller 59. Any other suitable connection may be used as well. The controller 59 includes an output headphone jack 64, which is preferably connected to a pair of conventional headphones 72. These headphones 72 are provided with the reproduced audio information from the player device 60 to provide an audible signal to the user.

The controller 59 preferably houses a plurality of input devices, 65, 66 which allow a user to enter information and selections. Preferably two value buttons 65 control various functions along with the edit select button 66 of the controller housing 59. One feature that may be controlled is the mode in which vibration information is provided to drive the actuators 27 and 28 of the footwear device 26. The value buttons 65 may also be used to adjust volume to the headphones 72 to get the best mix of audible information through the headphones 72 and vibrations from the footwear device 26. The media player 60 may also include a volume control that may also be adjusted for more or less gain structure. That is, the controller 59 may operate in different modes to provide the vibration information from the reproduced audible information.

Another function of the value change buttons 65 is to insert or adjust a delay in the audible information provided to the headphones 72. The audible signal sent to the headphones is preferably delayed since it takes approximately 23.7 milliseconds for nerve receptors in the feet to detect the vibration of the device 26 and deliver the signal to the sensory cortex of the brain in a human five foot seven and ½ inch tall while it takes only six milliseconds for a sound sent to the ears to arrive at the sensory cortex of the brain. Thus, a delay of approximately 16.66 milliseconds may be introduced to the audible signal such that it reaches the sensory cortex of the brain at around the same time as the vibrations are perceived. This delay aligns the body's senses into a state of enhanced/heightened sensory perception. The goal of the delay is to have the two channels of perception data, audio and touch (vibrations) arrive in the sensory cortex at the same time to pinpoint and enhance the artistic reality of the creation using the science of neurology, and the superior power of tactile sensation.

Yet another function of the value change buttons 65 is to select a pulse mode in which the reproduced audible information is replaced by a series of augmented signals, or pulses, based on the media player's reproduced audio information. In this case, the original audio from the media player 60 is replaced by the augmented signals. The controller 59 preferably analyzes the envelope of the incoming reproduced audio information and replaces it with corresponding pulses. The use of pulses reduces power consumption and provides improved performance of the actuators 27, 28. Use of pulses instead of original audio also allows for lower bandwidth requirements when wireless transmission is used as well. Also the pulses are preferably within a crucial signal band.

The crucial signal band may be selected based on user preference. The frequency of the augmented signals will initiate the vibrations 33 and 34 provided by the actuators 27 and 28 in the footwear device 26, which are felt by the user. A particular user may prefer a lighter vibration response, and thus, could select the appropriate frequency band as the crucial signal band. It is noted that the augmented signals or the media player signal being sent to the device 26 need not be in tune harmonically to the original audio provided to the headphones of the user for the device to convey a realistic live experience. Thus, the controller 59 provides the vibration signal for initiating vibration of the actuators 27, 28 in different modes. In one mode, the vibration signal closely follows the reproduced audible information. However, additional enhancement data may be included, if desired, to maximize vibration.

It is noted that many of the vibrations that are felt in the feet of a person, at a concert for example are at frequencies that are not audible, and thus, typically not included in the reproduced sound signal. These subsonic vibrations are typically below 20 Hz or so. These signals are sometimes also referred to as infrasonic. Thus, in a preferred embodiment the control unit 59 will recreate and insert in the vibration signal, information that corresponds to such subsonic vibrations. Thus, the user will be able to feel these vibrations even though they are not present in the reproduced sound signal at all. Further, as noted above, the control unit 59 may be used to enhance, or diminish other frequencies, as desired, in order to enhance the realistic live sensory experience for the user as well.

The controller 59 also houses a dual colored LED 67 that is preferably utilized to show the user what mode they are in. Alternatively, or in addition, inaudible pulse vibrations may be transmitted to the footwear device 26 to signal to the user through tactile sensation the mode in which the system is operating. The controller 59 also preferably houses two hard wired output jacks 68 and 69 for a cable (or cables) or a wire(s) C that conveys vibration signals to the device 26 to drive the actuators 27 and 28. The USB input socket 33 may also be used to receive vibration signals to initiate vibration of the actuators 27 and 28 of the footwear device 26. The controller 59 may include two additional LED's illustrated as 70 on FIG. 5 and as 74, 75 on FIG. 6 that indicate wireless transmission 76 of data from the controller 59 to the footwear device 26. The receiver indicators 29 and 30 on the footwear device 26 are integrated for wireless communication to receive wireless transmission 76 from the controller 59 by the right and left footwear device 26.

The controller 59 may also include the USB port 71 (FIG. 5) which serves multiple purposes to allow many peripherals to be connected to the controller 59 using a single standardized interface socket. One option is a USB microphone to capture live sound and convert it to initiate a vibration signal to provide vibrations 33 and 34 via the actuators 27 and 28. The USB port 71 also comes into play for interfacing the controller 59 to a media player universal port, for example, to upgrade features for peripheral devices that could interface to the media player 60 operating system or to the controller 59 to enhance the systems capabilities and to make use of digital as well as analog data in the controller 59 and footwear device 26.

The actuators 27, 28 may be implemented in any suitable format. One or more of the actuators initiate vibration to provide a complete and realistic experience providing two channels of sensory data, audible and tactile, that is, vibrations. However, it is noted that the actuators 27, 28 are operable to impart vibrations to the user, via the footwear device 26. Thus, the actuators 27, 28 are not conveying sound to the nerve receptors in the feet, but are conveying vibration to the nerve receptors in the feet of the user. Generally speaking, in order to get maximum benefit, it is advisable that the user wears two footwear devices 26 (See FIG. 6, for example), however, one footwear device may be worn if desired. Further, while it is advantageous to mount the actuators in the footwear device 26, the actuators may be removed and mounted to any footwear, if desired. In this case suitable connectors are provided to connect the actuators 27, 28 to the power source and necessary electronics of the housing 31 to initiate vibration. The power source and electronics may be provided with the controller device 59 if desired. Thus, the actuators 27, 28 are preferably powerful enough to provide sufficient vibration to supply good tactile feedback while also energy efficient as well.

Figure 1:
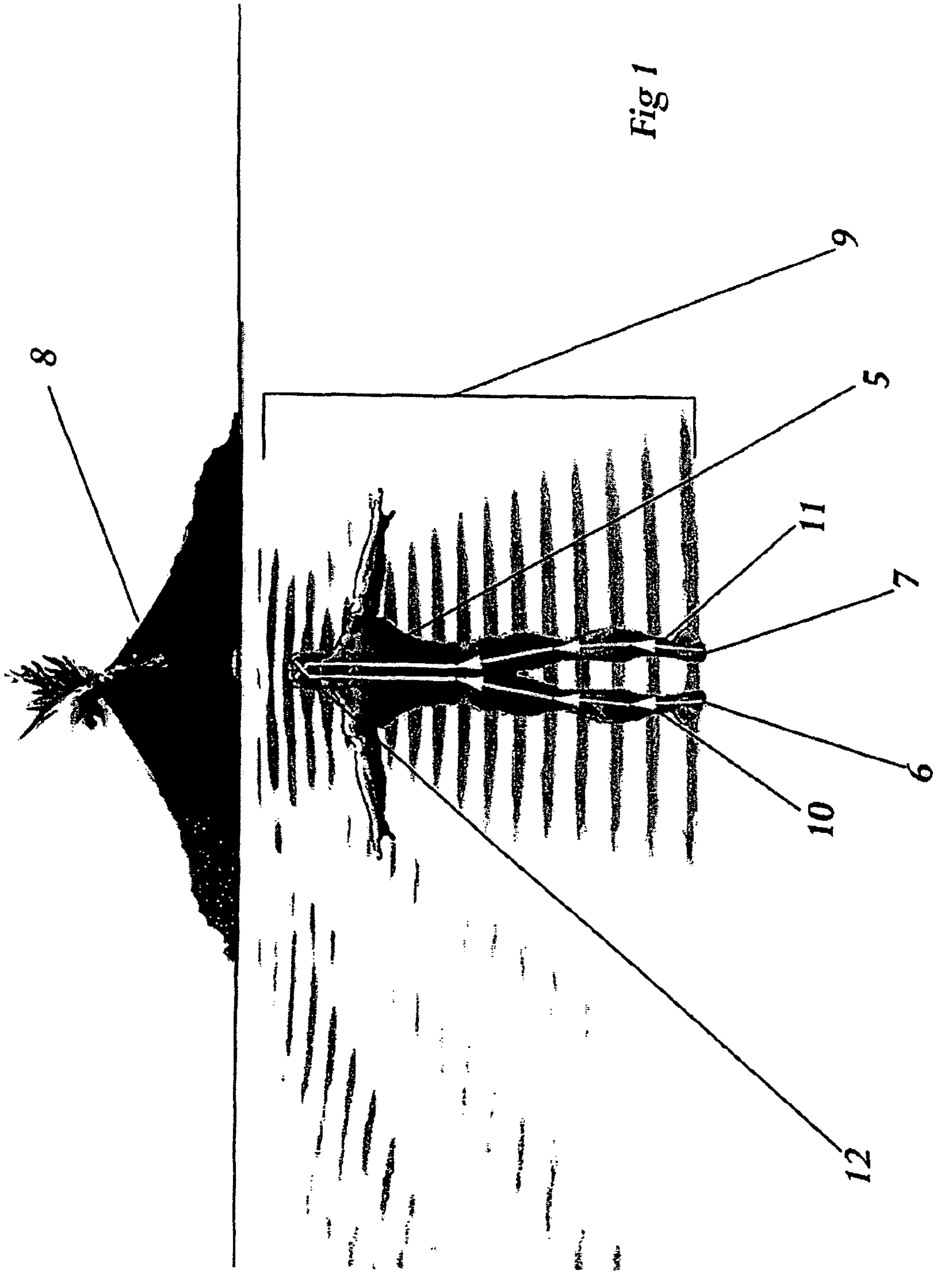
FIG. 1 is an illustration representing how humans hear and feel sound.
Figure 2:
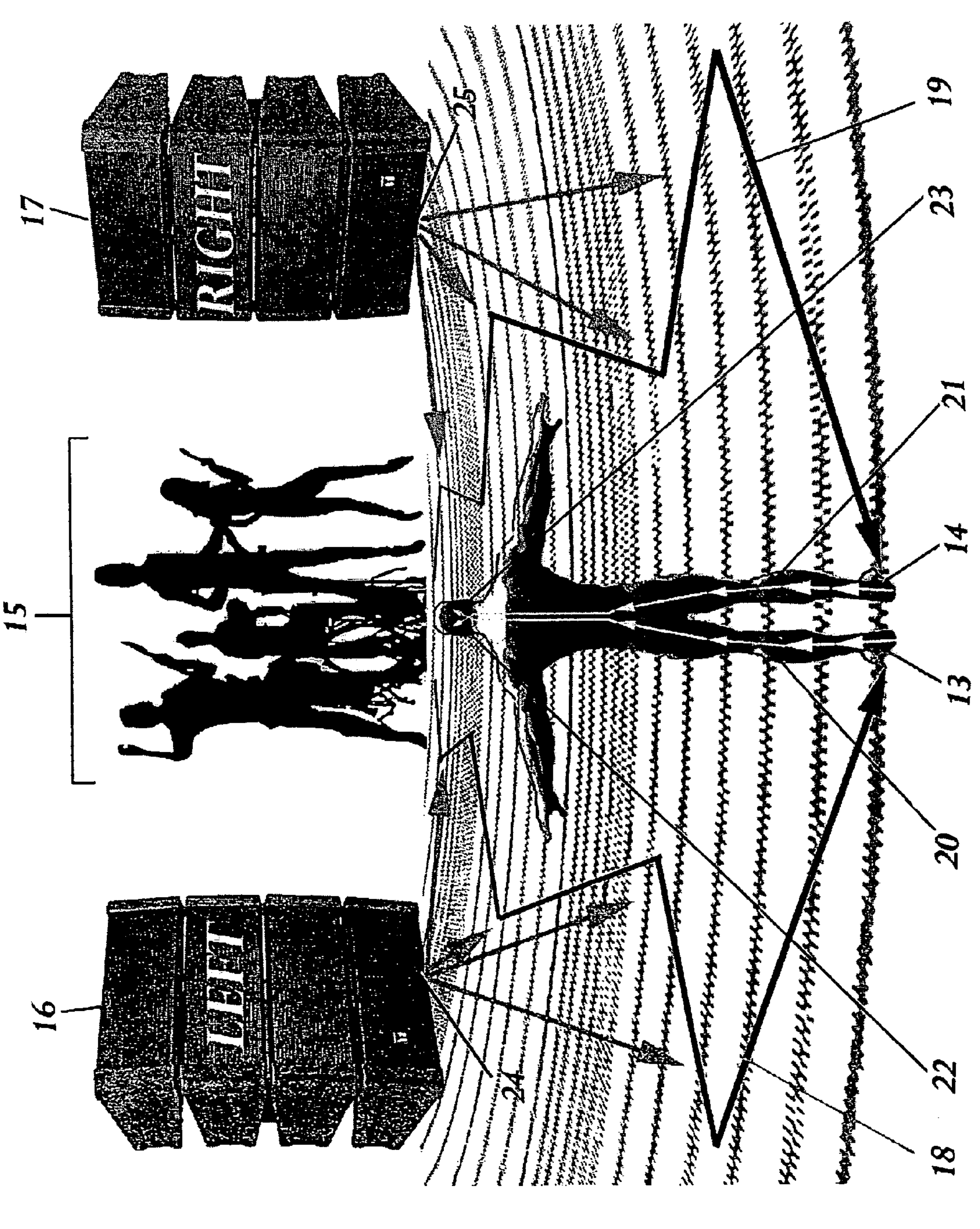
FIG. 2 is another illustration representing how humans hear and feel sound at a modern rock concert.
Figure 8:
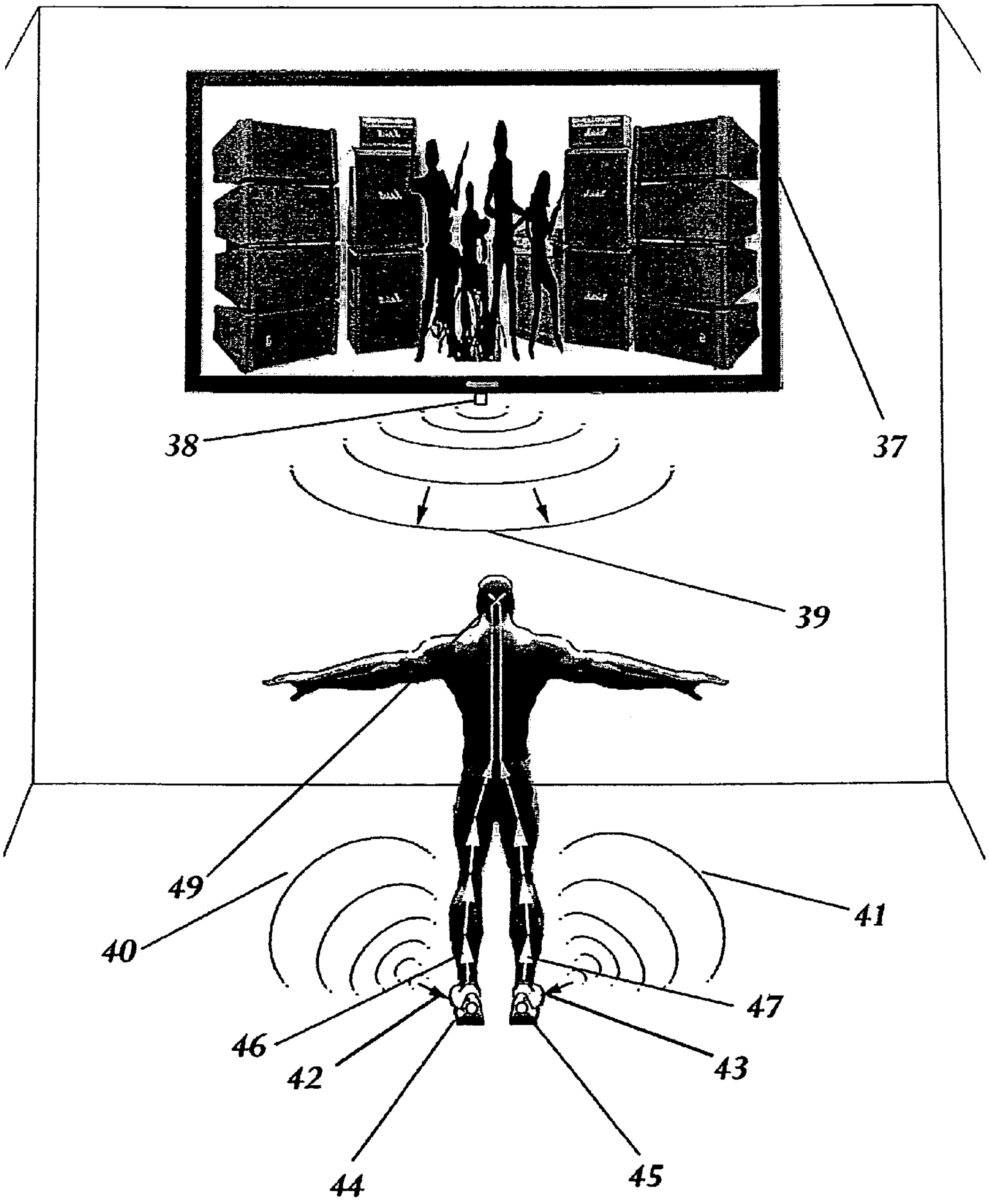
FIG. 8 is an illustration of an alternative embodiment of an entertainment system utilizing a footwear device in accordance with another embodiment of the present application.
Figure 9:
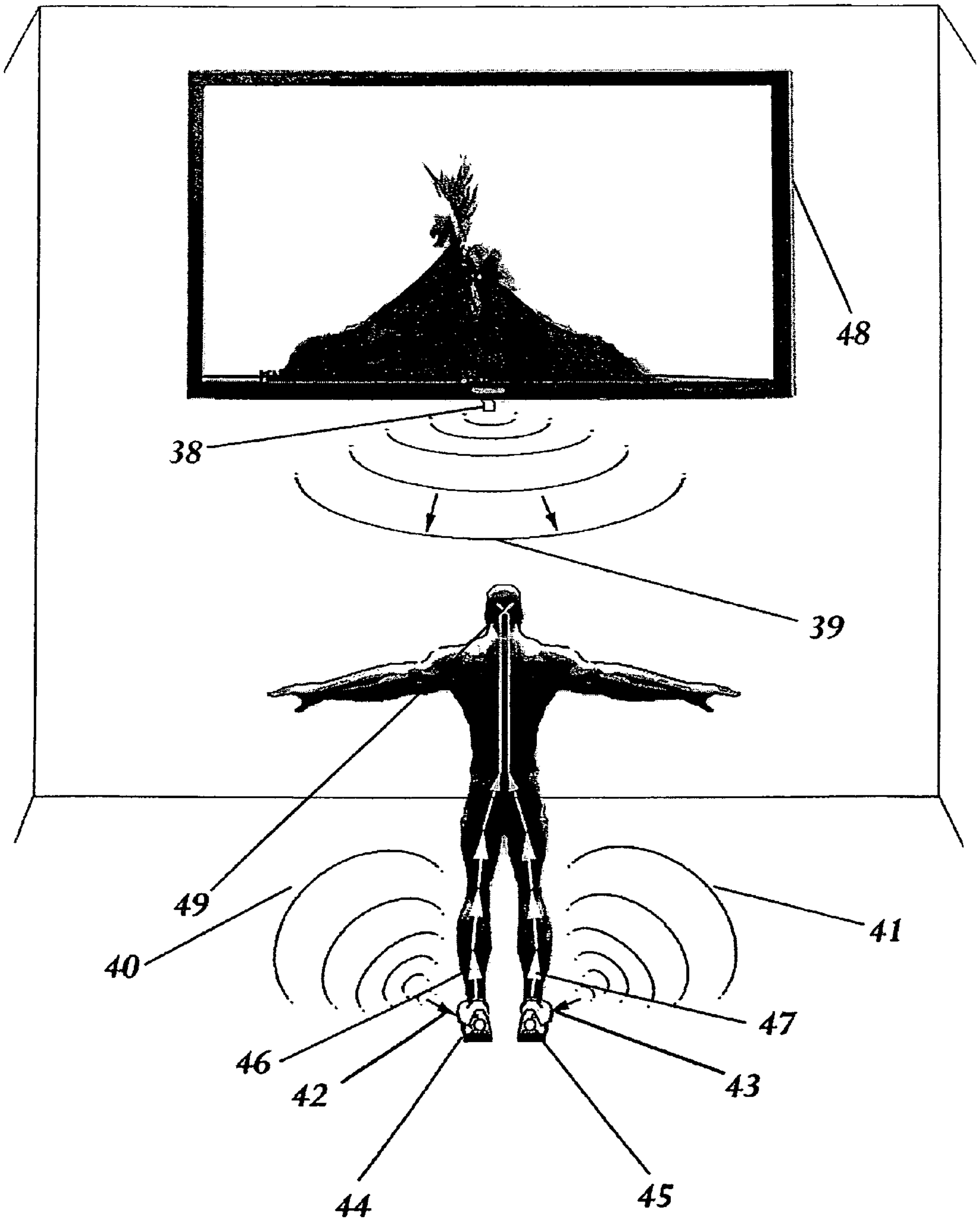
FIG. 9 is another illustration of an alternative embodiment of an entertainment system utilizing a footwear device in accordance with another embodiment of the present application

In FIG. 8, the footwear device 26 is shown used without a physical connection to the portable device or controller 59. Instead, the device 26 receives a wireless transmission of the vibration signals. FIG. 8 is similar to FIG. 2 and common reference numerals are used to refer to common elements. The system depicted in FIG. 8, however, includes a controller/wireless transmitter 38 that wirelessly transmits vibration signals 39 to the footwear devices 26 worn by the user. In this case, the concert of FIG. 2, for example, is displayed on the flat panel TV monitor display device 37. The user who is watching a replay or watching a concert remotely can be provided with an experience similar to that of standing there watching the concert live, since the footwear 26 will provide vibrations that enhance the experience for the user as described above, including the generation of vibrations representing subsonic portions of the performance that are not present in the reproduced material. FIG. 9 similarly illustrates a user watching an eruption of a volcano, similar to that illustrated as a live event in FIG. 1, on a similar display 48 and utilizing the footwear and system of the present application with a wireless connection to enhance this observation.

Figure 7:
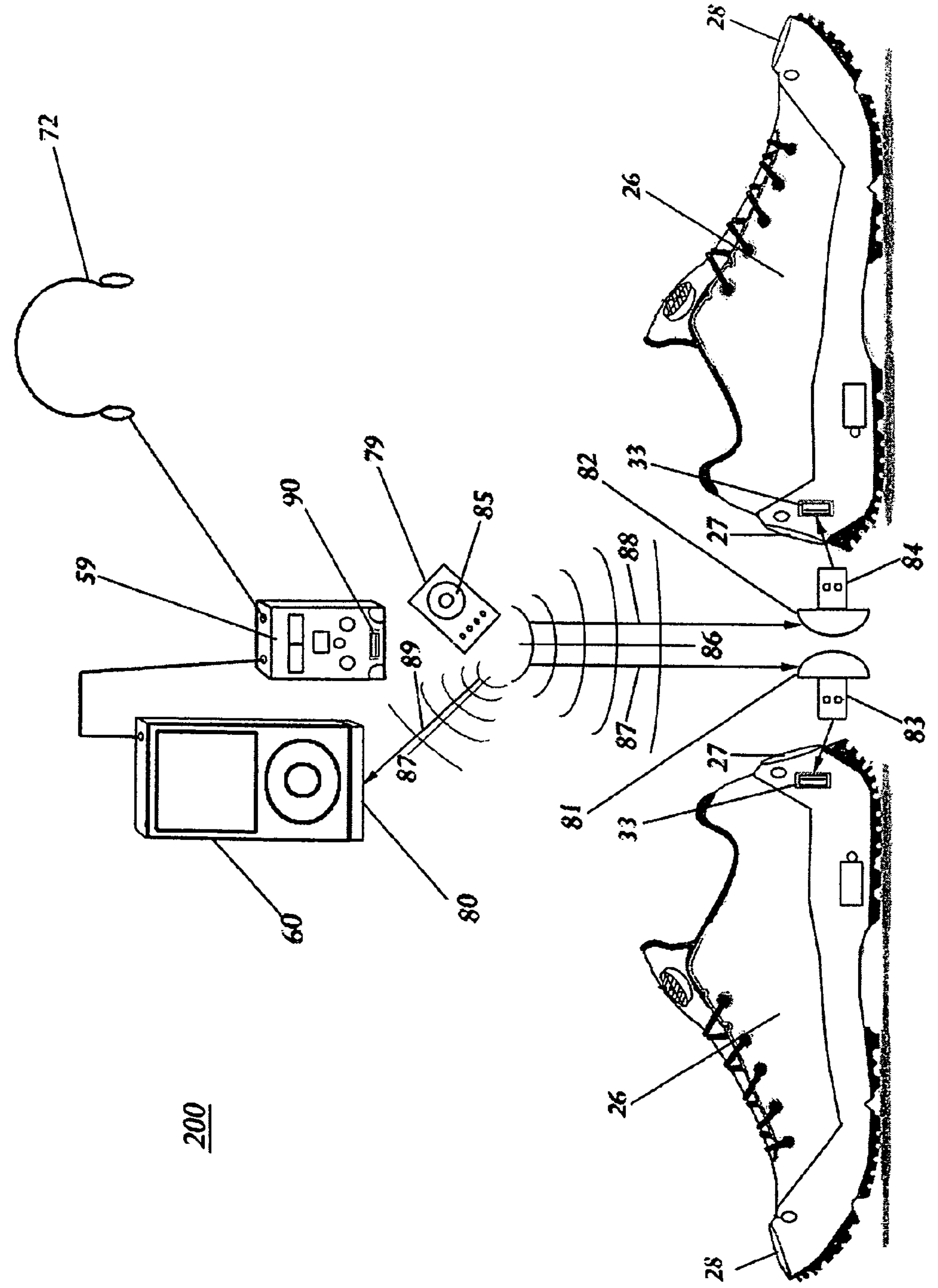
FIG. 7 is an illustration of another embodiment of an entertainment system for use with the footwear device of the present application.

In another embodiment illustrated in FIG. 7, the system 200 eliminates all need for transmitting a vibration signal to the footwear actuators 27, 28 in the device 26 either wirelessly or otherwise. A plurality of three individual portable media players 60, 81, 82 communicate in unison with each other via a single remote control 79. In a preferred embodiment two micro portable media players 81, 82 with USB interface male connectors 83, 84 are inserted in the USB jack 33 on both the right and left footwear device(s) 26. A single handheld portable media device 60 is preferably used to provide the audible information used to send the audible signal to the user's headphones 72. The device 60 may make use of some of the features of the controller 59, described above, for example, volume control for headphones 72. In addition, the delay provided to the audible information sent to the headphones to synchronize with the vibration information conveyed from the footwear devices may also be used. A wireless receiver 80 is preferably provided in the device 60, which receives control signals 87 highlighted with arrow 89 from the remote control 79. The receiver 80 preferably interfaces with the player 60 via a universal port.

Thus in this embodiment, the three media players 60, 81, 82 are provided and equipped with the same operating system and programming. The only difference between the players being that the micro portable media player devices 81, 82 that are interfaced to the USB jacks 33 on the footwear devices 26, need not be equipped with a viewing screen, although some users may prefer a viewing screen. These devices only require a wireless receiver built in or integrated as an attachment to receive control signals 86 highlighted with arrows 87 and 88 of the essential primary controls 85 from a remote control 79 to synchronize operation controls of all digital devices 60, 81, 82.

The remote control 79 may transmit in infrared or radio frequency ranges or any other suitable signal. Using the remote control 79 to control all three digital player devices 60, 81, 82, they can be operated to work simultaneously. That is, all player device receivers are tuned to receive the same command, or instruction signals 86, 87 from the remote control 79. The remote control unit 79 may be inserted into the USB input socket 90 on the controller 59, if desired to take advantage of some features of the controller 59. Alternatively, the remote control unit 79 can be inserted in the universal port of a portable media device 60 to control all digital media devices. The two micro media players 81, 82, are preferably connected via the USB jack 33 of the footwear device(s) 26 and also send the vibration information through the USB interface input jack 33 to initiate vibration to the actuators 27 and 28. The right footwear device would receive only the right stereo signal from its micro USB digital media device 82, and the left footwear device would receive the left stereo signal from its micro USB digital media device 81, matching the stereo image received by the right and left ears to match the stereo vibration felt by the nerve receptors in the right and left foot wearing the device 26. The vibration information is preferably pre-loaded and stored in the players 81, 82.

The user would have the ability to upload entertainment material including the audio information and optimized vibration information related to the entertainment material to the respective devices 60, 81, 82, so that the remote control 79 can be used to provide primary control commands, or instructions to all three players. However, the vibration information recorded on the mini players 81, 82 may already be optimized and it would be unnecessary for any processing to enhance the force vibration of the actuators 27, 28 affixed to the footwear device 26. Even the delay to the headphones can be optimized before it is downloaded to media player 60. As stated above this is for the audible signal such that it reaches the sensory cortex of the brain at around the same time, as the force vibrations are perceived in the sensory cortex from the feet.

Let it be understood that this method of synchronizing digital portable media devices by single remote control to initiate vibration to the actuators in the footwear device 26 can be simplified. For instance, the portable handheld media device headphone output volume control may be controlled independently by its own volume control on the handheld media device 60, without affecting the volume controls on the micro USB portable media devices 81, 82 inserted in the USB input socket 33 of the footwear device 26. Preferably the headphones 72 may be connected to a separate volume control.

All of the other features mentioned above, that have to do with value change options on the controller, and the controller itself 59, need not be implemented. All the processing options for initiating vibration to further enhance the experience can be pre-produced in the audio data content by the music engineer and producer, as part of the downloading software for the individual media devices 60, 81, 82. The individual media devices would preferably operate in unison by a single remote control 79. Infrasonic signals and enhanced signals for vibration of actuators can be produced by augmenting the original audible information. This can all be achieved by the producer and engineer wearing the device and utilizing audio engineering tools to achieve their artistic goals. This new data could be purchased and downloaded to the mini player affixed to the footwear 26. The infrasonic data would be stored on either the right or left stereo track of each individual mini media player 81, 82 affixed to the right and left footwear device. The footwear device could house one amplifier to power the infrasonic signal and enhanced signal to initiate vibration of the actuators 27, 28. A single footwear device could also house two amplifiers. A single amplifier could power the infrasonic signal for the rear actuator 27 of the footwear device 26 and a second amplifier in the same footwear device to power a front actuator 28 with the enhanced signal. Both enhanced signals and infrasonic signals are programmed to rhythmically match the stereo image of the original audio. Thus, the controller 59 may be eliminated entirely, if desired.

While the present application discusses the use of two actuators 27, 28 additional, or fewer actuators may be used if desired. In addition, the actuators may be positioned at any point on or in the footwear as desired. Further, while the footwear device 26 is generally illustrated as a sneaker, it is noted that the device 26 may be embodied as any piece of footwear.

The USB input socket 33 on the footwear device 26 can also be fitted with micro radio receiver devices. This would allow the user to be able to feel the vibrations associated with radio programming in both right and left footwear devices 26. In this case the portable player 60 will also include a radio receiver to receive the audible information accompanying the vibrations and to provide it to the headphones 72. This is yet another unique application where the synchronization between audible sound and vibration of the footwear device 26 needs no integrated wireless transmission of source signals. As described above the producer and engineer may enhance certain features of the music or of the vibrations accompanying it. This is achieved to produce the desired force vibration from the actuators in the device 26. These augmented signals are production enhanced and could be a new digital audio format. The new digital audio format meant to initiate vibration to the actuators in the footwear device are not meant for providing audible signals to the ears of user, but to enhance force vibration in the actuators. To take advantage of this new audio format, a digital media player application could be accessed through the user's home computer system or lap top, for example, for planning and organizing digital music and video files that would contain the new format. Customers would be able to purchase downloadable content through the Internet, for example, and upload it to the mini players 81, 82. This feature could provide a management system for content to be downloaded to a handheld media device 60 as well.

The footwear device 26 of the present application may be used in a wide variety of applications. For example, the music connoisseur can enjoy feeling the force vibrations of any musical or sound content through simulated ground force feedback vibration of the stereo audio data felt by the feet. This technology creates a live experience whether it is from the user's favorite music, video game music and sound effects, or movie soundtracks and sound effects. Another application is music, movies and video games in general. That is, this content would be produced to complement the footwear device and system to create force feedback vibrations queued to various audio signals from the entertainment content immersing the entertainment enthusiast to the state of overdriven sensory perception.

Another application for the device 26 would be geared toward entertainers such as musicians and dancers. For instance entertainers commonly use in-ear monitors to get close and personal with what he or she is hearing while performing, using headphones that are usually inserted in the ears. However using in-ear monitors, the performer often feels cut-off from live vibrations and feels isolated from the rest of the band members. Using in the ear monitors alone limits the hearing only to the stereo image through the headphones blocking out the natural vibrations of live music. The footwear device 26 brings back the live vibrations and presents a greatly improved way to monitor music for live entertainers. This system for not only hearing but feeling the music would allow the user to customize his or her own vibration mix, tuning into their desired performing partners vibrations increasing the entertainer's ability to connect with the musical material. The device would obviously give the entertainer better timing skills by allowing the user to feel the musical embodiment. Similarly, a dancer would have better ability to connect with the choreography wearing the device also. All sports enthusiasts could use the device to motivate themselves through heightened sensory perception of what he or she is listening to, and feeling via vibrations through the actuators in their sports footwear devices to reach deeper for his or her goals.

Music engineers and producers would benefit from using this device as well. The device would heighten the engineering production options to create a new art form as described above. Also the engineer, producer, or writer would have limitless possibilities to explore due to the fact that this technology opens up a new dimension of how an engineer, producer or writer constructs a musical embodiment, now that the sound is not only heard but the musical vibration is alive and running through the body of the user.

One of the other ways to use the device 26 would be to teach students the mechanics and rhythm of a musical embodiment, by allowing a teacher to break down a musical arrangement, so that the student can feel the different force feedback vibrations generated by the musical embodiment. This would be achieved by the students wearing the device 26.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A footwear device for enhancing an entertainment experience comprising:

a first actuator mounted in the footwear device and operable to impart a vibration to the footwear device, the vibration based on a vibration signal generated from a selected frequency range of reproduced sound included in the entertainment experience;

the vibration signal simulates vibrations that would be felt by a user through a resonating floor at a live event; and the vibration signal is augmented to simulate different floor compositions.

2. The footwear device of claim 1 further comprising:

a control unit operable to receive the vibration signal associated with the reproduced sound and to provide control signals for driving the first actuator based on the vibration signal;

an amplifier operable to amplify the control signal provided to the first actuator; and a power supply connected to the control unit and the amplifier to provide power.

3. The footwear device of claim 2, wherein the first actuator is attached to the footwear device at a first position.

4. The footwear device of claim 3, further comprising a wireless receiver device operable to receive the vibration signal and provide it to the control unit.

5. The footwear device of claim 3, further comprising:

a second actuator attached to the footwear device at a second position different than the first position; and a second amplifier operable to amplify control signals provided to the second actuator.

6. The footwear device of claim 5, wherein the first actuator, second actuator, power supply and amplifier are mounted in a removable insert configured for removable mounting in or on the footwear device.

7. The footwear device of claim 3, further comprising an input portal connected to the control unit to convey information for the actuator.

8. The footwear device of claim 7, wherein the vibration signal is received via the input portal.

9. The footwear device of claim 7, wherein the information for the actuator that is received by the input portal is enhanced vibration information configured to optimize the entertainment experience.

10. The footwear device of claim 9, wherein the enhanced vibration information is provided from a digital data source.

11. The footwear device of claim 10, wherein the digital data source is a computer readable medium storing data downloaded from any electronic device.

12. The footwear device of claim 1, further comprising a micro digital player device connected thereto, the micro digital player device operable to store the vibration signal.

13. The footwear device of claim 12, wherein the micro digital player device further comprises a wireless receiver device operable to receive instruction signals from a remote control unit to instruct operation of the micro digital player device to provide the vibration signal to the footwear device.

* * * * *